(12) United States Patent
Smith

(10) Patent No.: US 8,237,521 B1
(45) Date of Patent: Aug. 7, 2012

(54) TRIAXIAL MEMS ACCELERATION SWITCH

(75) Inventor: Gabriel L. Smith, Odenton, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 62 days.

(21) Appl. No.: 12/964,131

(22) Filed: Dec. 9, 2010

(51) Int. Cl.
*H01H 51/22* (2006.01)
*H01H 57/00* (2006.01)

(52) U.S. Cl. .............. 335/78; 335/80; 335/83; 335/86; 200/181; 257/414

(58) Field of Classification Search .................. 335/78, 335/80, 83, 86; 200/181; 257/414
See application file for complete search history.

(56) References Cited

U.S. PATENT DOCUMENTS

| | | | | |
|---|---|---|---|---|
| 6,509,816 B1 * | 1/2003 | Staker et al. | ..................... | 335/78 |
| 2002/0140533 A1 * | 10/2002 | Miyazaki et al. | ............... | 335/78 |
| 2003/0076006 A1 * | 4/2003 | Suzuki | .......................... | 310/309 |
| 2005/0219017 A1 * | 10/2005 | Shirakawa | ....................... | 335/78 |

* cited by examiner

*Primary Examiner* — Mohamad Musleh
(74) *Attorney, Agent, or Firm* — Michael C. Sachs

(57) ABSTRACT

A MEMS contact acceleration switch may include a first non-conductive layer; a second, conductive layer next to the first layer; and a third, conductive layer next to the second layer. The third layer may include a generally circular, annular mass and a center anchor post disposed interior of the annular mass. At least one spiral spring may connect the annular mass to the center anchor post. The third layer may include an x-y plane detection electrode separated from the annular mass by a gap. A fourth conductive layer may be disposed next to the third layer. A fifth layer may be disposed next to the fourth layer and may include a z-axis detection electrode. A second z-axis detection electrode may be disposed on the first layer. A plurality of conductive vias may extend through the first layer and be in electrical communication with the detection electrodes.

17 Claims, 8 Drawing Sheets

US 8,237,521 B1

TRIAXIAL MEMS ACCELERATION SWITCH

STATEMENT OF GOVERNMENT INTEREST

The inventions described herein may be manufactured, used and licensed by or for the U.S. Government for U.S. Government purposes.

BACKGROUND OF THE INVENTION

The invention relates in general to inertial switches and in particular to small electro-mechanical inertial switches.

Acceleration detectors for commercial and military uses are known. Commercial uses include detecting impacts of colliding objects, detecting changes in vehicle speed, and detecting vibration events. Military uses include detecting impact of a munition with a target, detecting launch of a munition from a gun, and detecting the spin of a munition. Examples of acceleration detectors include accelerometers and threshold contact switches.

Some acceleration detectors are single direction, mass-spring systems, in which a mass moves relative to an internal sensing element. In the case of accelerometers, a change in electrical voltage corresponding to the position of the mass provides information about the acceleration or G-level. In the case of a threshold contact switch, an open state may indicate that the mass has not moved, and a closed state may indicate that the mass has moved and closed a gap, due to an external acceleration. The mass movement (or lack thereof) may indicate that the predetermined G-level has or has not been exceeded.

Both accelerometers and threshold contact switches may be used in fuzing applications. An advantage of a threshold contact switch, compared to an accelerometer, is that a threshold contact switch may require no continuous electric power or signal processing. The absence of power and processing may reduce the complexity of the fuze electronics. For a contact switch, only two contacts may need to be monitored to determine switch closure. The mechanical nature of the contact switch may allow acceleration thresholds to be fixed to a predetermined level by adjusting mechanical features internal to the switch. The adjustable mechanical features may include, for example, gaps, springs, masses, and volumes.

U.S. Pat. No. 6,765,160 (hereinafter '160) issued on Jul. 20, 2004 to Robinson discloses an omnidirectional microscale impact switch. The '160 switch may not have equal sensitivity or response for all azimuths in the x-y plane. The pathways for the electrical signals in the '160 switch may not allow for rapid solder flow mounting on a printed circuit board. In addition, the substrate etching needed to create a z-axis gap may be time-consuming and/or impractical. The metal-pattern required for the z-axis contact electrode may also be time-consuming and/or difficult to create in the etched substrate trench. A need exists for an improved triaxial MEMS acceleration switch.

SUMMARY OF THE INVENTION

It is an object of the invention to provide a triaxial MEMS acceleration switch having equal sensitivity or response for all azimuths in the x-y plane.

It is another object of the invention to provide a triaxial MEMS acceleration switch that may be rapidly and easily mounted on a printed circuit board.

It is a further object of the invention to provide a triaxial MEMS acceleration switch that requires less time to fabricate.

One aspect of the invention is a MEMS contact acceleration switch that may include five layers. A first layer may be made of a non-conductive material. A second layer may be disposed next to the first layer and may be a spacer layer made of a conductive material. A third layer may be disposed next to the second layer and may be made of a conductive material. The third layer may include a generally circular, annular mass and a center anchor post disposed interior of the annular mass. At least one spiral spring may have one end connected to the annular mass and another end connected to the center anchor post. The spiral spring may be wound around the center anchor post. At least one x-y plane detection electrode may be separated from the annular mass by a gap. A perimeter area may be separated from the at least one x-y plane detection electrode by a gap. The second layer may support the center anchor post, the at least one x-y plane detection electrode, and the perimeter area.

A fourth layer may be disposed next to the third layer and may be another spacer layer made of a conductive material. A fifth layer may be disposed next to the fourth layer. The fifth layer may be a z-axis electrode made of a conductive material. The fifth layer may be separated from the annular mass by a second gap.

A second z-axis electrode may be disposed on the first layer, facing the annular mass, and separated from the annular mass by a third gap.

A plurality of conductive vias may extend completely through the first layer. The plurality of vias may include a first via in electrical communication with the anchor post, a second via in electrical communication with the z-axis electrode, a third via in electrical communication with the second z-axis electrode, and a fourth via in electrical communication with the at least one x-y plane detection electrode.

The switch may include a gas in the gap, the second gap, and the third gap.

The switch may further include a sixth layer disposed next to the first layer on an opposite side of the first layer from the second layer. The sixth layer may include conductive pads in electrical communication with respective ones of the plurality of vias.

Another aspect of the invention is an apparatus that may include a wafer and a plurality of MEMS contact switches disposed on the wafer. At least one of the plurality of switches has an acceleration threshold that differs from an acceleration threshold of at least another one of the plurality of switches. The third layers of the plurality of switches may have a same z-axis thickness. The z-axis thickness may be in a range of about 5 microns to about 500 microns.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION OF THE PREFERRED EMBODIMENTS

Figure 1:
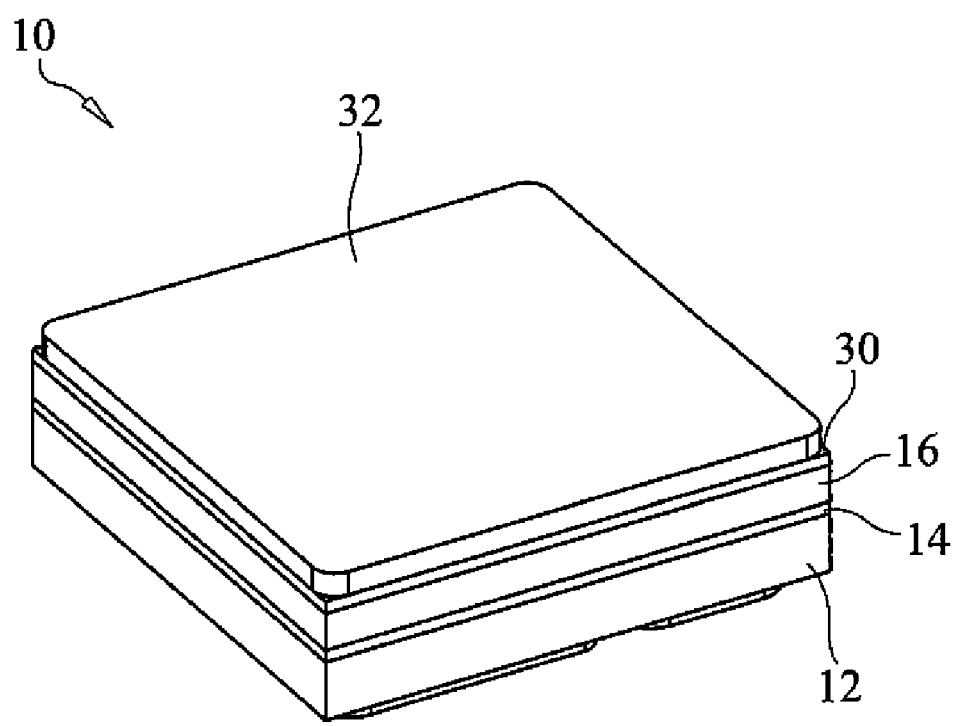
FIG. 1 is a perspective view of an embodiment of a MEMS contact acceleration switch.
Figure 2:
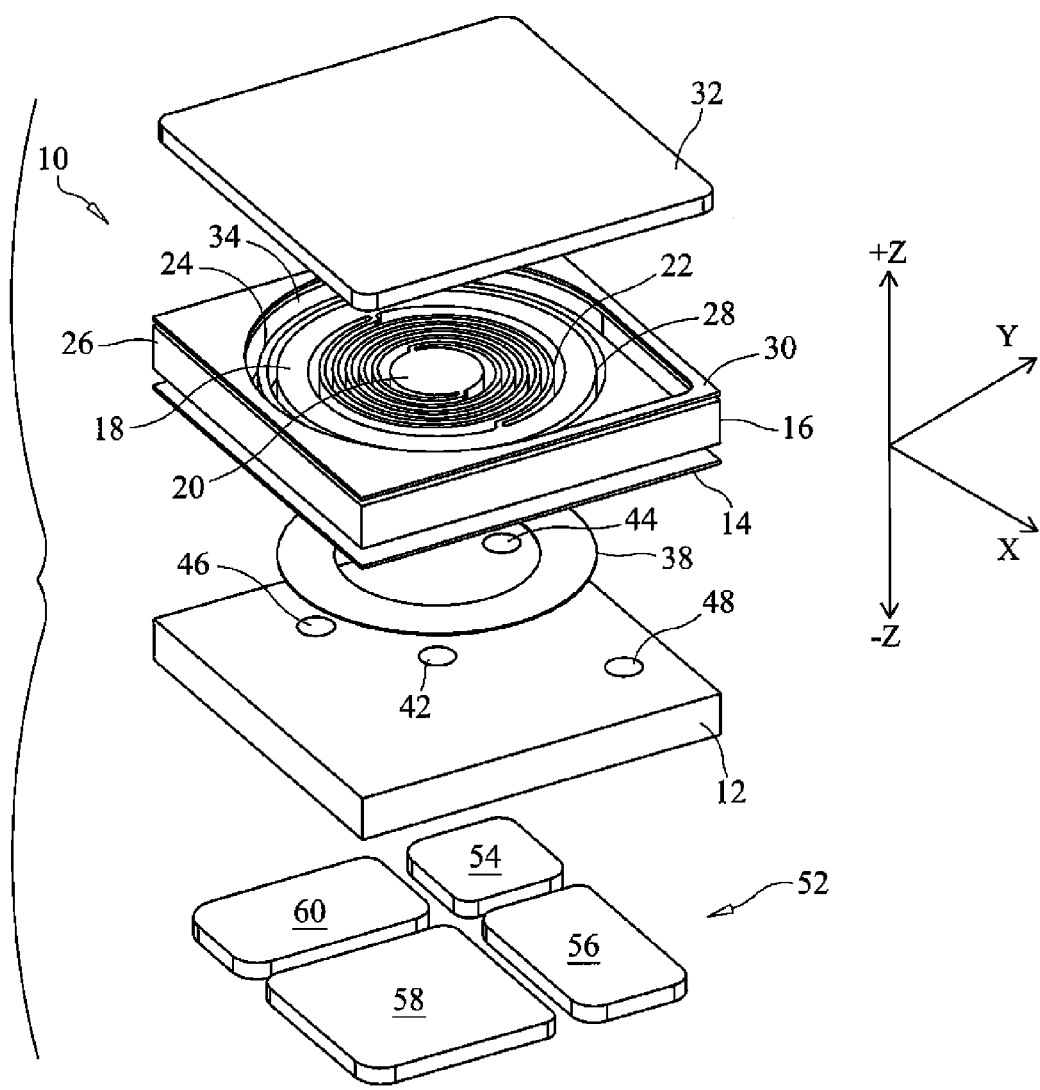
FIG. 2 is an exploded view of the switch of FIG. 1.

Micro Electromechanical Systems (MEMS) are microscale moving devices that may include electronic functions. Embodiments of a contact acceleration switch in accordance with the present invention may be realized in MEMS devices. Compared to larger devices, MEMS devices may enable smaller size, lower cost, and increased repeatability. Using photolithography, for example, unique enabling MEMS features on the order of 1-10 microns in size may be created, with tolerances on the order of 10-100 nm. For instance, a 96% volume reduction has been demonstrated in a 1×1×1 mm package size scaled down from a traditionally constructed 5 mm package size. Lower relative cost and improved repeatability may be realized through wafer level batch fabrication and packaging of MEMS devices. Because MEMS manufacturing techniques may create hundreds to thousands of acceleration switches on a single wafer using batch fabrication, the total cost per switch may be significantly lower relative to larger scale acceleration contact switches.

FIGS. 1-4 show an embodiment of a MEMS triaxial contact acceleration switch 10. Switch 10 may detect inertial events that exceed a predetermined acceleration threshold. Operation of switch 10 has been demonstrated in sizes varying from 1 mm on a side to 4 mm on a side. The MEMS design for switch 10 may be practical from about 0.1 mm on a side to about 20 mm on a side.

Switch 10 may include a first layer 12 made of a non-conductive material. As used herein, "conductive" and "non-conductive" mean electrically conductive and electrically non-conductive, respectively. A second layer 14 may be disposed next to first layer 12. Second layer 14 may be a spacer layer made of a conductive material. A third layer 16 may be disposed next to second layer 14. Third layer 16 may be made of a conductive material.

Figure 3A:
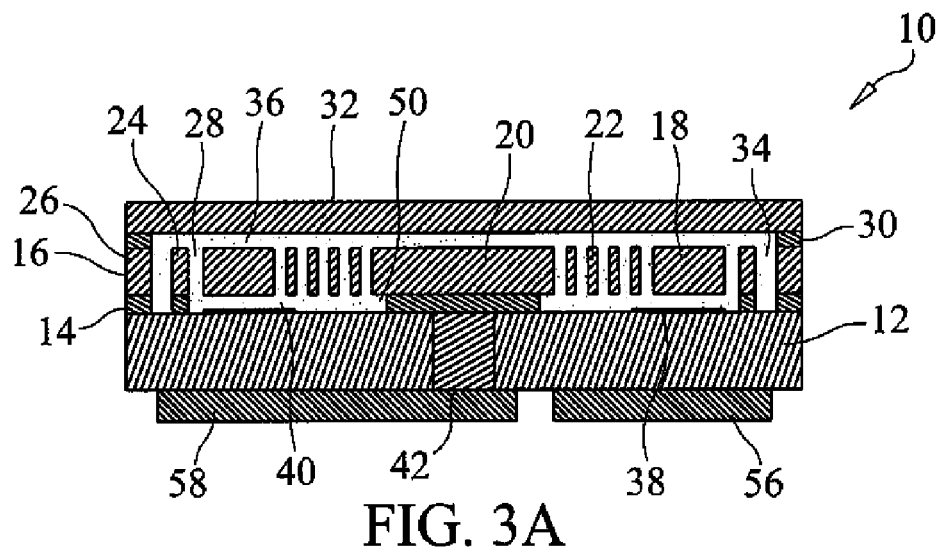
FIG. 3A is a sectional view taken along the line 3A-3A of FIG. 3B.
Figure 3B:
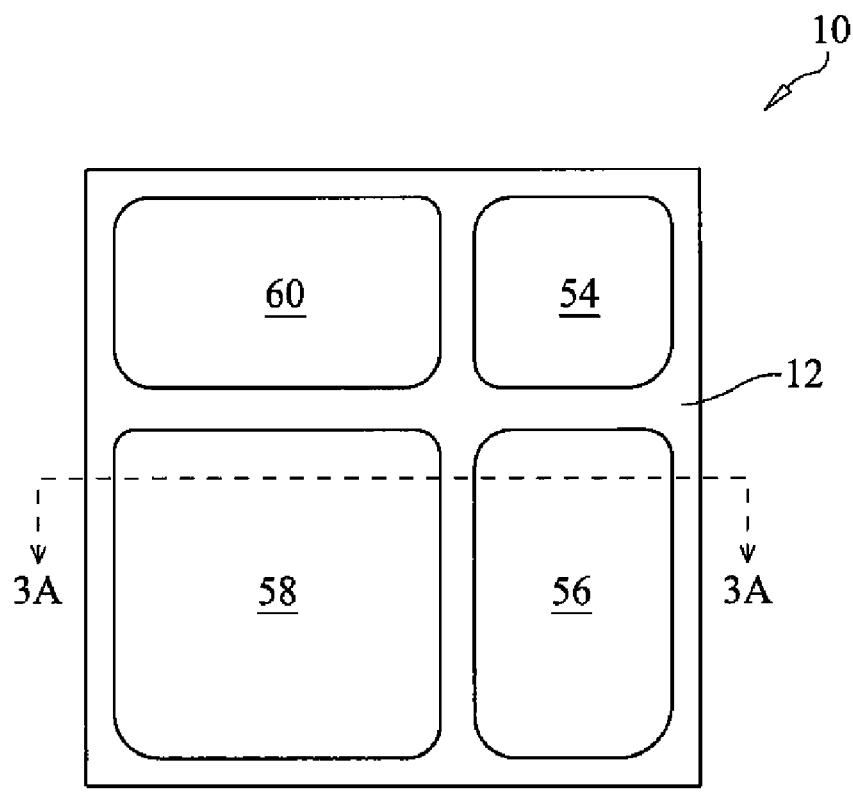
FIG. 3B is a bottom view of the switch of FIG. 1.
Figure 4A:
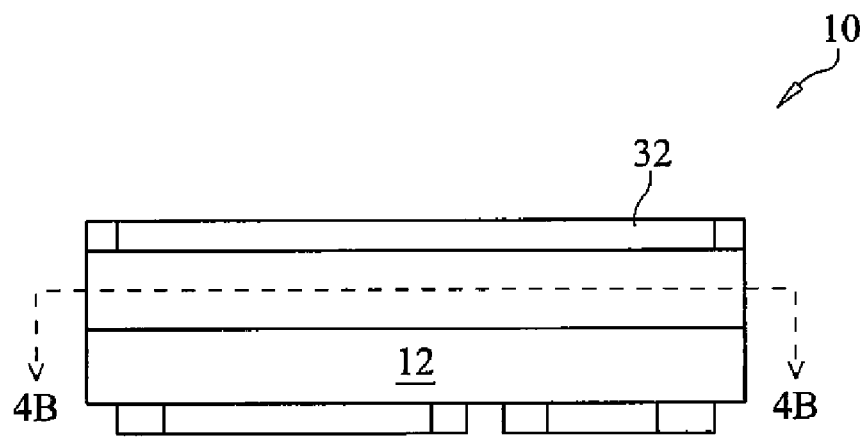
FIG. 4A is a side view of the switch of FIG. 1.
Figure 4B:
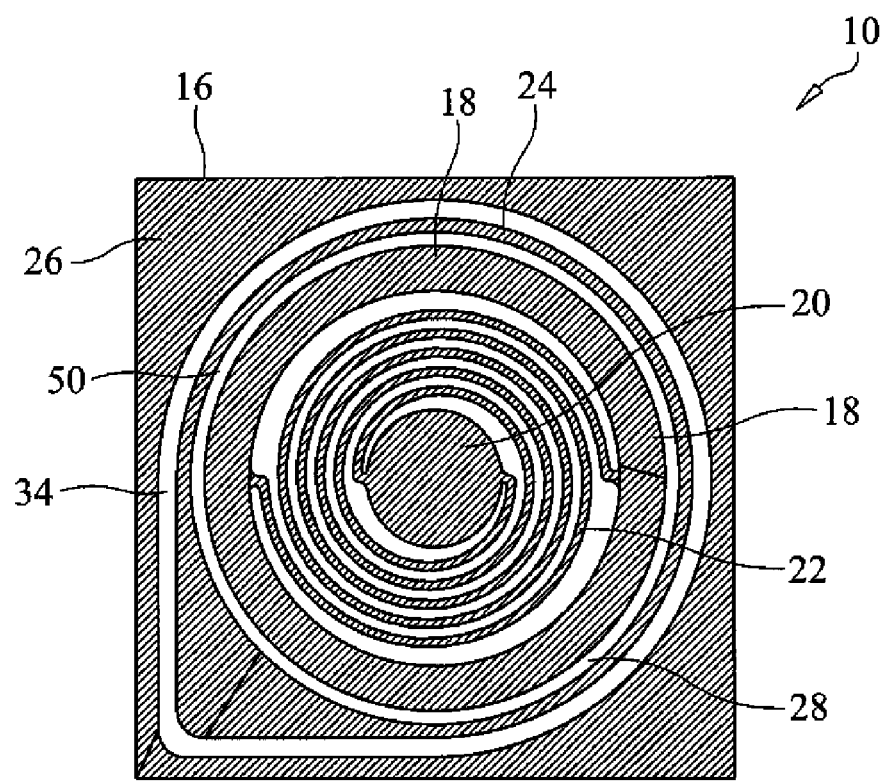
FIG. 4B is a sectional view taken along the line 4B-4B of FIG. 4A.

Third layer 16 may include a generally circular, annular mass 18 and a center anchor post 20. Layer 16 may include at least one spiral spring 22 having one end connected to annular mass 18 and another end connected to center anchor post 20. Layer 16 may include at least one x-y plane detection electrode 24 separated from annular mass 18 by a gap 28. Layer 16 may include a perimeter area 26 separated from x-y plane detection electrode 24 by a gap 34. As best seen in FIG. 3A, second layer 14 may support conductive center anchor post 20, at least one conductive x-y plane detection electrode 24, and perimeter area 26.

Switch 10 may include a fourth layer 30 next to third layer 16. Fourth layer 30 may be a spacer layer made of a conductive material. A fifth layer 32 may be disposed next to fourth layer 30. Fifth layer 32 may be made of a conductive material. Fifth layer 32 may function as a z-axis electrode. Fifth layer 32 may be separated from annular mass 18 by a gap 36. A second z-axis electrode 38 may be disposed on first layer 12. Electrode 38 may face annular mass 18 and may be separated from annular mass 18 by a gap 40. Electrode 38 may have a shape similar to the annular shape of mass 18.

A plurality of conductive vias 42, 44, 46, 48 may extend completely through first layer 12. Vias 42-48 may be orthogonal to first layer 12. Via 42 may connect to anchor post 20. Via 44 may connect to fifth layer 32, which may function as a z-axis electrode. Via 46 may connect to second z-axis electrode 38. Via 48 may connect to at least one x-y plane detection electrode 24.

Annular mass 18 may be suspended by at least one spiral spring 22. Spiral spring 22 may be connected to center anchor post 20. An acceleration applied to switch 10 in any direction may cause annular mass 18 to move relative to one or more of x-y plane detection electrode 24, positive z-axis electrode 32, and negative z-axis electrode 38. Contact of annular mass 18 with one or more of x-y plane detection electrode 24, positive z-axis electrode 32, and negative z-axis electrode 38 may complete an electrical circuit, thereby "closing" switch 10. Annular mass 18 may bridge one or more of gaps 28, 36, and 38 to contact x-y plane electrode 24, positive z-axis electrode 32, and negative z-axis electrode 38, respectively.

Switch 10 may include a gas 50 in gaps 28, 36, 38. Gas 50 may be, for example, air or nitrogen. The fluidic damping provided by gas 50 may favorably reduce resonant response of switch 10. Gas 50 may provide non-trivial high frequency vibration damping, especially for devices as small as switch 10. Switch 10 may also be vacuum-packaged at the wafer level. Evacuation of switch 10 may result in higher sensitivity to vibration inputs at natural mechanical frequencies of switch 10.

The widths of gaps 28, 36, 38 may be the same, or each gap may have a different width. In some embodiments, the widths of gaps 28, 36, 38 may be less than about 100 microns. In other embodiments, the widths of gaps 28, 36, 38 may be less than about 10 microns.

Switch 10 may include a sixth layer 52 disposed next to fifth layer 32. Sixth layer 52 may include one or more conductive pads 54, 56, 58, 60. Each conductive pad 54, 56, 58, 60 may be electrically connected to vias 44, 48, 42, 46, respectively. Large conductive pads 54-60 may be surface-mounted with solder to a standard circuit board. Pads 54-60 may function as a mechanical attachment device for switch 10. Pads 54-60 may function as electrical signal paths for the detecting electrodes 24, 32, 38.

Positive z-axis electrode 32 (fifth layer) may function as a lid for switch 10. As shown in FIG. 3A, electrode 32 may be electrically and mechanically connected to first layer 12 by perimeter area 26 of third layer 16 and by spacer layers 30 and 14. Electrode 32 may provide a gas tight seal for hermetic sealing of switch 10. The gas seal may provide for variation in pressure when switch 10 includes gas 50 for vibration damping.

Mass 18 may contact electrodes along one or more of the x, y and z axes. The omnidirectional spiral spring or springs 22 may function in the x, y and z axes using a single mass 18. Thus, mass 18 may detect acceleration in all directions. The spring constants of springs 22 may be the same along all three axes or may be different along each axis. An advantage of spiral springs in a contact switch may be that the x-y plane sensitivity or response is the same over the 360 degree azimuth of the annular mass.

Conductive components of switch 10 may be made of an electrically conductive material, for example, copper or nickel. The conductive material may be plated into a mold and patterned in a UV or X-ray photolithographic resist. For very high accelerations, the conductive material may be steel. Switch 10 may have a threshold acceleration level from about 5 Gs to about 100 KGs. Higher and lower thresholds may be possible. Switches made in accordance with the invention have been fabricated with thresholds of 50 G-85 KG. Higher G levels may enable a significantly higher limit to G-level bandwidth.

Figure 5A:
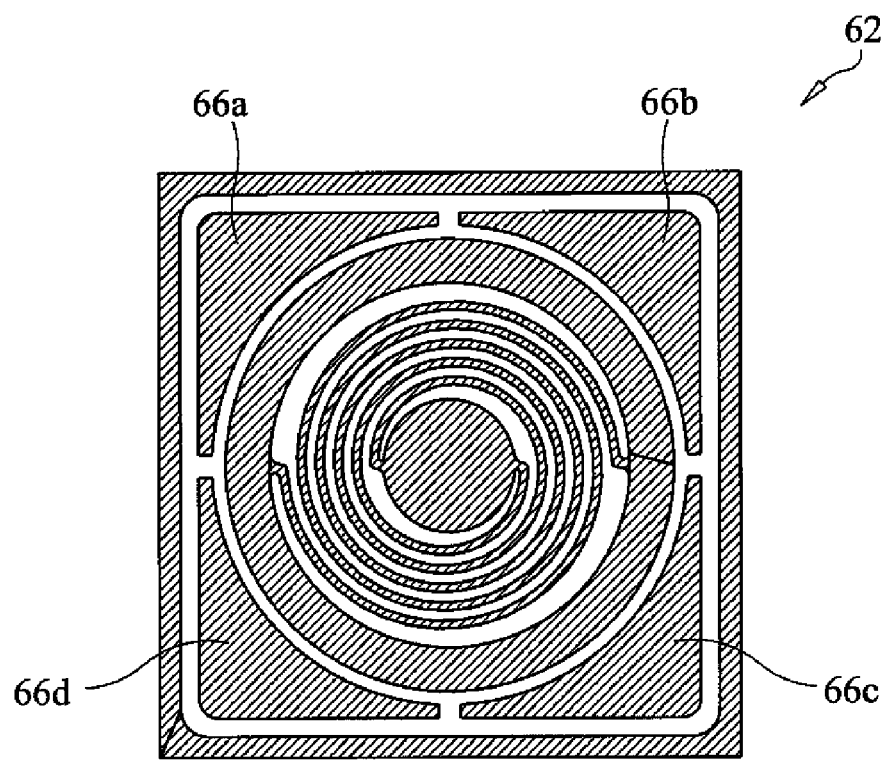
FIGS. 5A, 5B, 6A, 6B, 7A, 7B, and 8 are sectional views of other embodiments of MEMS contact acceleration switches, taken along lines situated similar to line 4B-4B of FIG. 4A.
Figure 5B:
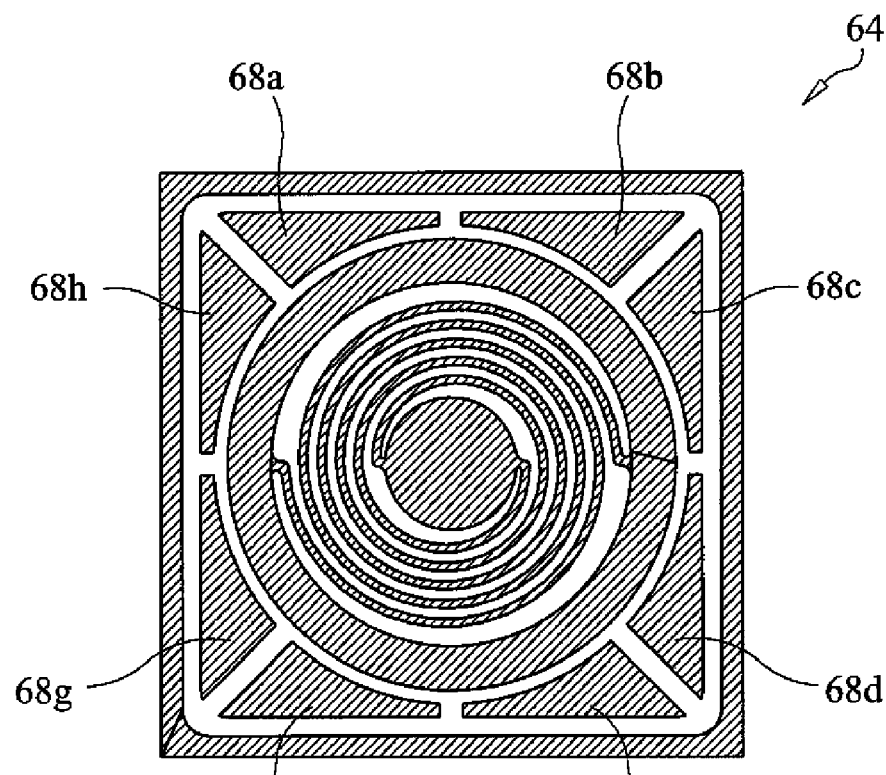
Figure 6A:
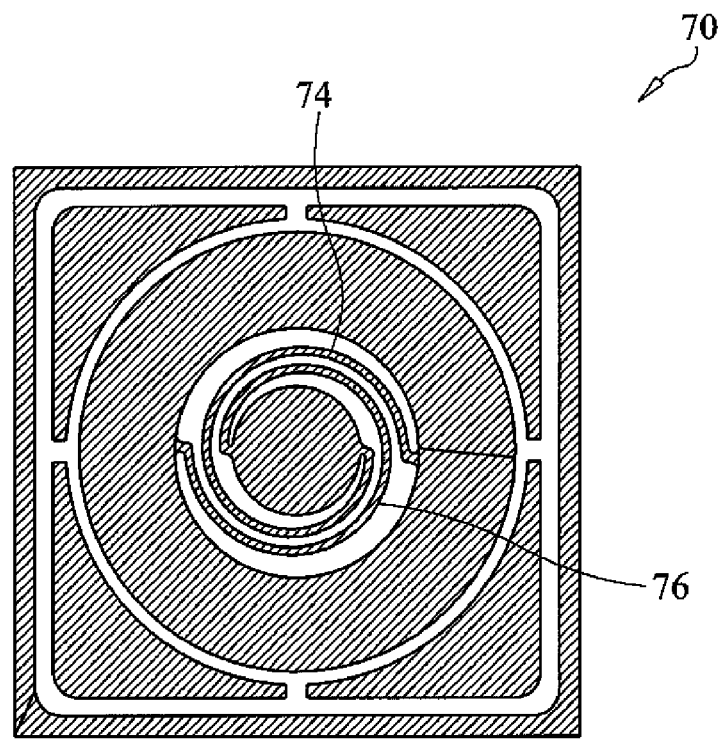
Figure 6B:
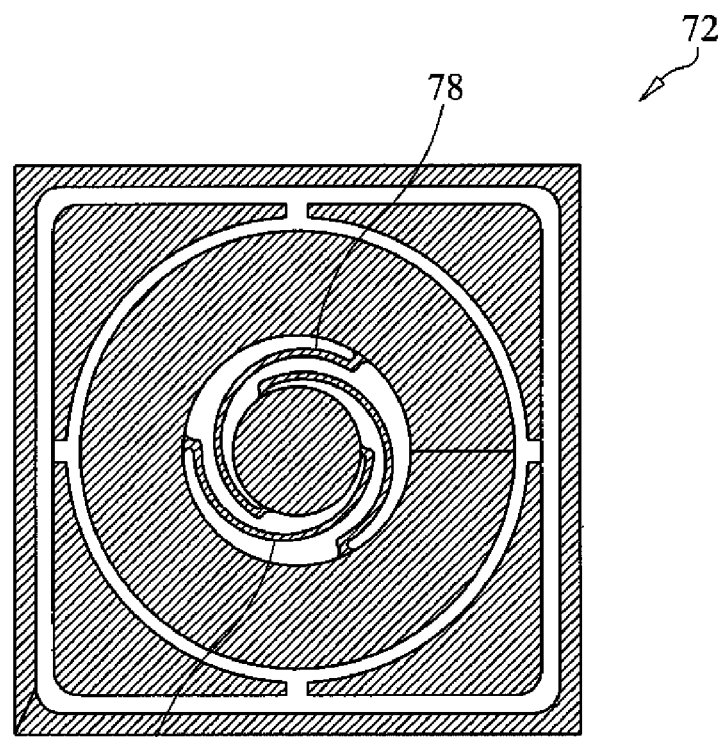

A contact electrode may be partitioned into electrically isolated portions. In that way, the inertial direction may be determined based on the direction of the input and the particular contact portions that are closed. For example, FIGS. 5A and 5B show respective switches 62, 64 in which the x-y plane detector has been divided into a plurality of electrodes. In switch 62, the x-y plane detector has been divided into four electrodes 64a, 64b, 64c, and 64d. In switch 64, the x-y plane detector has been divided into eight electrodes 68a-h. The number of discrete electrodes in the x-y plane may vary from, for example, one to twenty. As will be apparent to those of skill in the art, for each additional discrete electrode, an additional via may be included in first layer 12 and an additional discrete conductive pad may be included in sixth layer 52. Also, the structure of second layer 14, which is a conductive spacer layer, may be altered to support multiple, discrete electrodes Springs 22 may be wound clockwise or counterclockwise around center anchor post 20. Each spring 22 may use one or multiple spirals. One end of each spiral spring 22 may be fixed to anchor post 20. Spiral spring 22 may progress radially outward from anchor post 20 to the inside surface of annular mass 18. An advantage of a spiral spring may be the ease of maximizing the spring length in a small form factor. For example, the spiral springs 74, 76 of switch 70 in FIG. 6A each have a length of about one complete spiral. In the switch 72 of FIG. 6B, the spiral springs 78, 80 each have a length of about one half of a complete spiral.

Figure 7A:
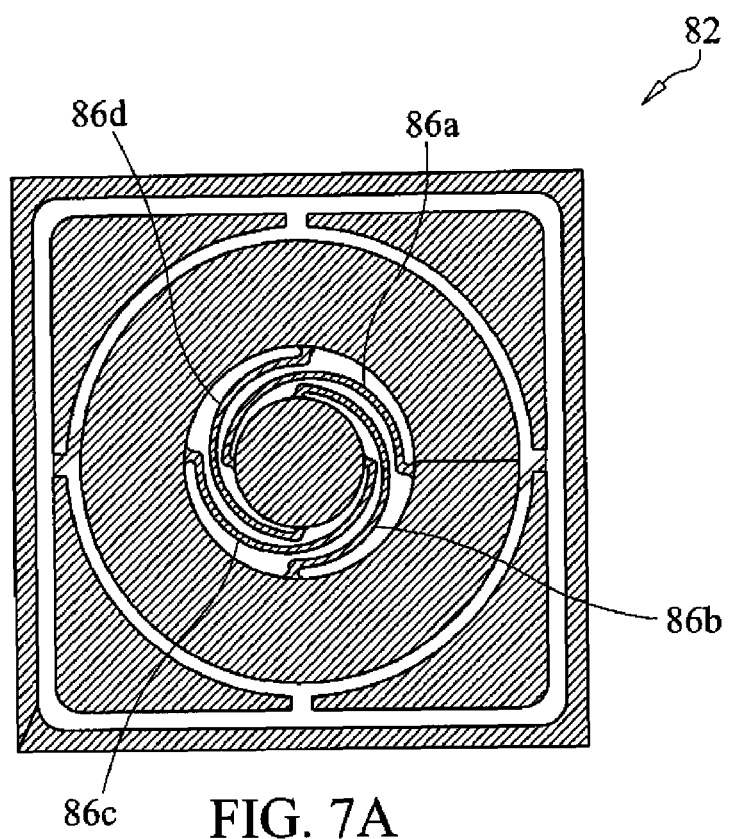
Figure 7B:
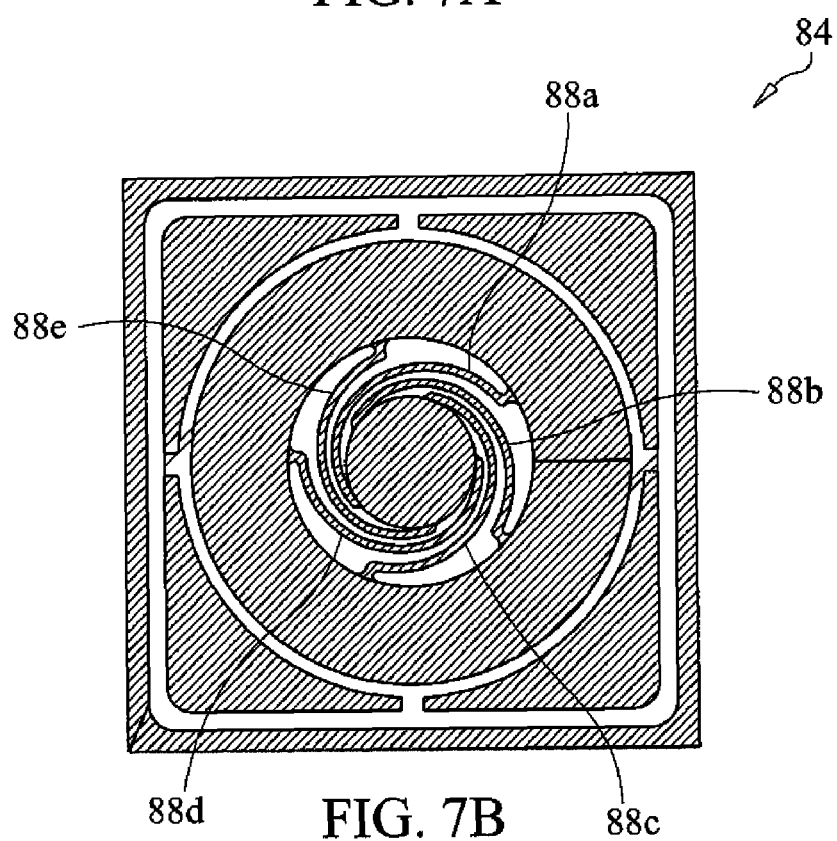

One or more spiral springs 22 may be used. FIG. 7A shows a switch 82 with four spiral springs 86a, 86b, 86c, and 86d. FIG. 7B shows a switch 84 with five spiral springs 88a-e. The number of spiral springs may vary, for example, from one to about ten. Total spring stiffness may be increased by adding more spiral springs. Metal springs may allow for an extremely high strain rate input of shock pulse.

Figure 8:
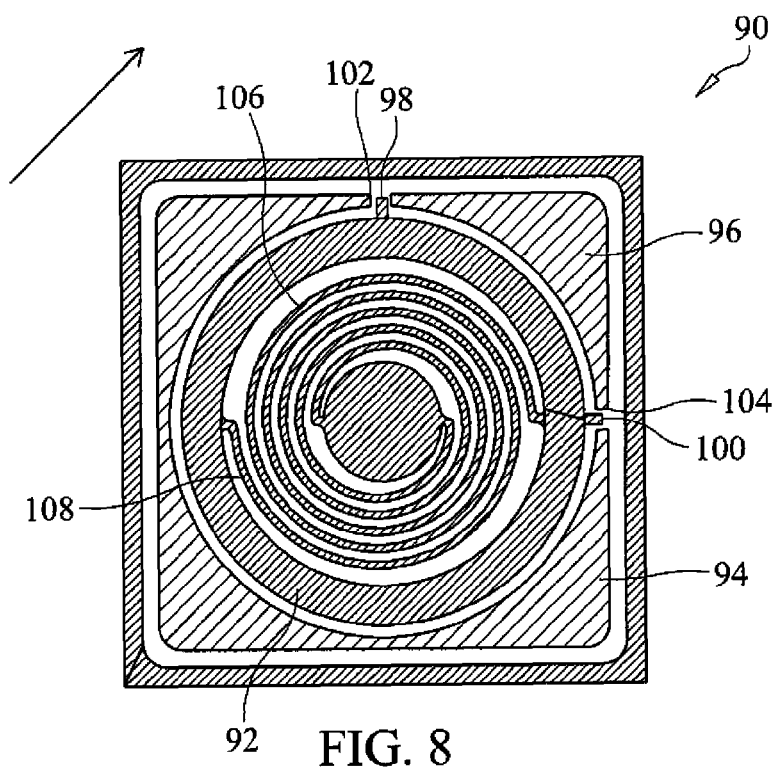

In some embodiments, the inventive switch may be used to detect radial spin. To detect spin of a body, the central longitudinal axis of the contact switch may not be collinear with the central longitudinal axis of the spinning body. FIG. 8 shows a switch 90 with an annular mass 92 and x-y plane electrodes 94, 96. Electrodes 94, 96 may be separated from each other by gaps 102, 104. Mass 92 may include one or more radially extending protrusions, such as stop tabs 98, 100, disposed in gaps 102, 104, respectively. Stop tabs 98, 100 may prevent damage to spiral springs 106, 108 during angular acceleration. Stop tabs 98, 100 may be conductive or non-conductive. The arrow in FIG. 8 represents the angular acceleration.

Figure 9:
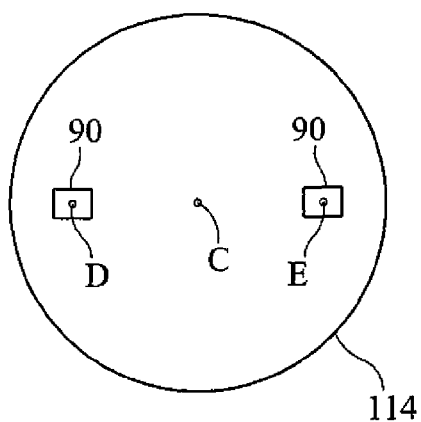
FIG. 9 is a schematic top view of an arrangement for detecting spin.

FIG. 9 is a schematic top view of an arrangement for detecting spin. A device 114 may be subject to spin about its central longitudinal axis C. One or more switches 90 may be disposed on device 114. The central longitudinal axes D, E of switches 90, 90 may not be collinear with axis C of device 114. Switch 90 may used, for example, to detect spin in a fuze in a munition. As shown in FIG. 9, two radially opposed switches 90 may be used to detect the presence of spin followed by the absence of spin. This function may be used in a fuze system as a "clean-up" function, for example, if the munition does not initiate on an extremely soft target below the switch threshold acceleration.

Figure 10:
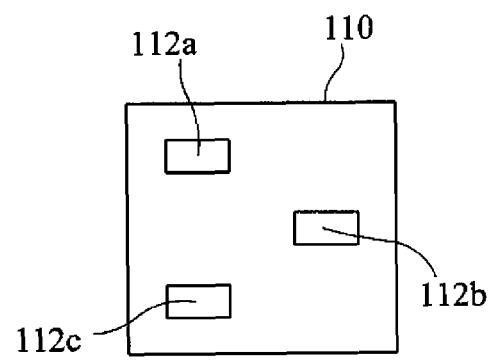
FIG. 10 is a schematic top view of a wafer with multiple acceleration switches.

An advantage of MEMS fabrication may be the ability to batch fabricate multiple devices on a single wafer. FIG. 10 shows switches 112a, 112b, and 112c fabricated on a single wafer 110. Switches 112a, 112b, 112c may each have a layer akin to third layer 16 of switch 10. Each respective third layer of switches 112a, 112b, and 112c may have the same z-axis thickness. This z-axis thickness may be, for example, from about 5 to about 500 microns. Each switch 112a, 112b, 112c may have a different acceleration threshold.

Differing acceleration thresholds for switches 112a, 112b, and 112c may be provided by varying, for example: 1) the length of the spiral spring or springs in each switch; 2) the number of spirals in each spring or springs; 3) the gaps between the masses and the electrodes; 4) the dimensions of the masses; and 5) the cross-sectional width of the spring or springs in the x-y plane. The differing acceleration thresholds may be achieved by using a common z-axis thickness and only changing features in the two-dimensional x-y plane. Thus, one may fabricate a plurality of switches on one wafer with a common thickness, but with varying G level thresholds. Such a device may be used to detect multiple G-levels. FIG. 10 shows three switches 112a, 112b, 112c, however, the number of switches on wafer 110 may be in the hundreds or greater.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. A MEMS contact acceleration switch, comprising:
   a first layer made of a non-conductive material;
   a second layer next to the first layer, the second layer being a spacer layer made of a conductive material;
   a third layer next to the second layer, the third layer being made of a conductive material, the third layer including
      a generally circular, annular mass;
      a center anchor post disposed interior of the annular mass;
      at least one spiral spring having one end connected to the annular mass and another end connected to the center anchor post, the at least one spiral spring being wound around the center anchor post;
      at least one x-y plane detection electrode separated from the annular mass by a gap; and
      a perimeter area separated from the at least one x-y plane detection electrode by a gap, wherein the second layer supports the center anchor post, the at least one x-y plane detection electrode, and the perimeter area;
   a fourth layer next to the third layer, the fourth layer being another spacer layer made of a conductive material;
   a fifth layer next to the fourth layer, the fifth layer being a z-axis electrode made of a conductive material, the fifth layer being separated from the annular mass by a second gap;
   a second z-axis electrode disposed on the first layer, facing the annular mass, and separated from the annular mass by a third gap; and
   a plurality of conductive vias that extend completely through the first layer, the plurality of vias including a first via in electrical communication with the anchor post, a second via in electrical communication with the z-axis electrode, a third via in electrical communication with the second z-axis electrode, and a fourth via in electrical communication with the at least one x-y plane detection electrode.

2. The switch of claim 1, further comprising a gas in the gap, the second gap, and the third gap.

3. The switch of claim 2, wherein a width of all gaps is less than about 100 microns.

4. The switch of claim 3, wherein a width of all gaps is less than about 10 microns.

5. The switch of claim 1, further comprising a sixth layer next to the first layer on an opposite side of the first layer from the second layer, the sixth layer including conductive pads in electrical communication with respective ones of the plurality of vias.

6. The switch of claim 1, wherein the third layer is made of a metal.

7. The switch of claim 1, wherein the at least one spiral spring comprises a plurality of spiral springs.

8. The switch of claim 1, wherein the at least one x-y plane detection electrode comprises a plurality of x-y plane detection electrodes and further wherein the plurality of x-y plane detection electrodes are electrically isolated from each other.

9. The switch of claim 1, further comprising at least one protrusion extending radially outward from the annular mass and disposed in a fourth gap in the least one x-y plane electrode.

10. A method comprising placing at least one switch of claim 9 on a device, wherein central longitudinal axes of the device and the switch are not collinear.

11. An apparatus comprising:
a wafer; and
a plurality of the switches of claim 1 disposed on the wafer, wherein at least one of the plurality of switches has an acceleration threshold that differs from an acceleration threshold of at least another one of the plurality of switches.

12. The apparatus of claim 11, wherein the third layers of the plurality of switches have a same z-axis thickness.

13. The apparatus of claim 12, wherein the same z-axis thickness is in a range of about 5 microns to about 500 microns.

14. The apparatus of claim 12, wherein the spiral springs of the switches with the differing acceleration thresholds have different lengths.

15. The apparatus of claim 12, wherein the spiral springs of the switches with the differing acceleration thresholds have differing numbers of spirals.

16. The apparatus of claim 12, wherein the annular masses of the switches with the differing acceleration thresholds have different masses.

17. The apparatus of claim 12, wherein at least one of the gaps, the second gaps, and the third gaps of the switches with the differing acceleration thresholds have different widths.

* * * * *